(No Model.)
G. H. CHATILLON.
SPRING SCALE.
No. 507,107. Patented Oct. 24, 1893.
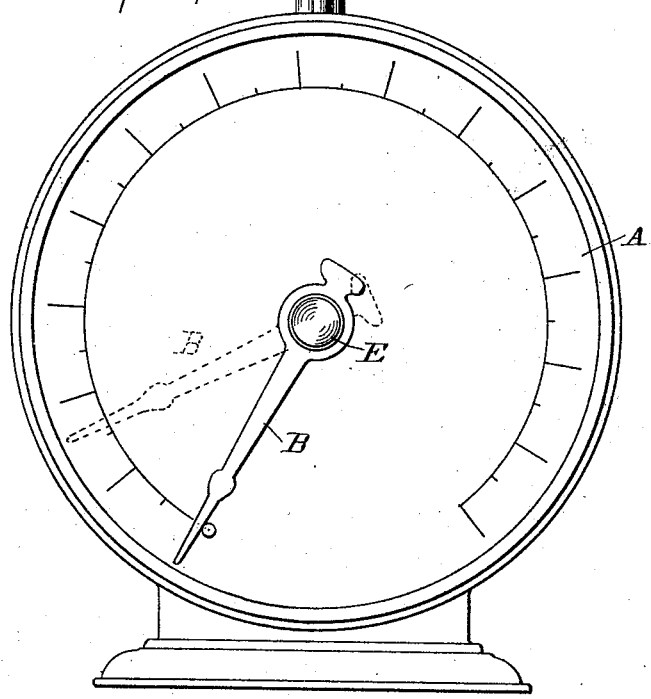
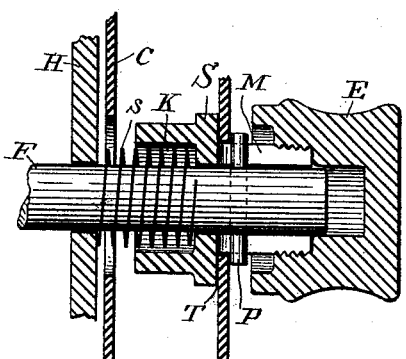
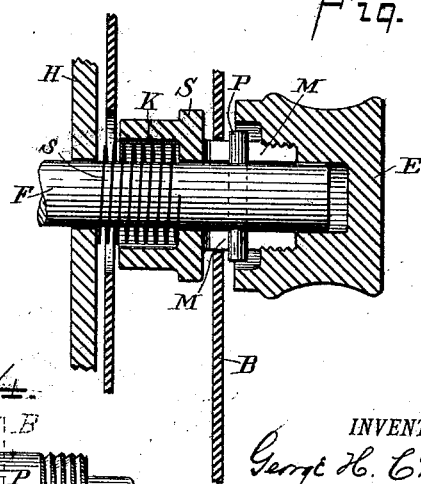
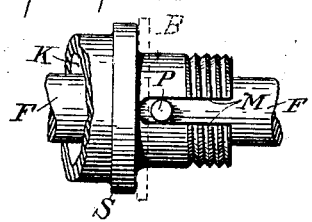
WITNESSES:
INVENTOR
George H. Chatillon
BY Briesen & Knauth
his ATTORNEYS.

UNITED STATES PATENT OFFICE.

GEORGE H. CHATILLON, OF NEW YORK, N. Y.

SPRING-SCALE.

SPECIFICATION forming part of Letters Patent No. 507,107, dated October 24, 1893.

Application filed June 3, 1893. Serial No. 476,419. (No model.)

*To all whom it may concern:*

Be it known that I, GEORGE H. CHATILLON, a resident of New York, in the county and State of New York, have invented an Improvement in Balances, of which the following is a specification.

My invention relates to balances and has for its object to provide a means for determining the net weight of substances, and to that end consists of the following described instrumentalities which will be particularly pointed out and recited in the claims.

In the drawings, forming part hereof, Figure 1 is a front elevation of a scale having a form of my improvement. Figs. 2 and 3 are enlarged views, in vertical section, showing a form of the improvement in the two positions required for its operation. Fig. 4 is a detail top view of the clutch mechanism shown in Figs. 2 and 3.

I have shown a form of my improvement applicable to a dial spring balance, but I do not limit myself thereto, as the balance itself forms no part of my invention which may be applied differently to different types of balances.

In the several views A indicates a spring-balance of the dial and pointer type.

B indicates the pointer and C the dial.

G is the stem of the scale pan and F is the scale arbor to which the pointer is attached in a manner to be described.

H may be a part of the framework such as a perforated cross-bar through which the arbor passes, and which serves as a bearing for the spiral springs $s$, or the spring may bear directly against the dial.

S is a sleeve on the arbor F formed with a recess K to receive the spiral spring which serves to press the sleeve longitudinally in the direction of the extremity of the arbor as will be understood. The pointer B is loosely hung on the sleeve S which is reduced to form a shoulder T to bear against the pointer B and force it against the pin P passing transversely through the arbor. The reduced end of the sleeve S is slotted as shown at M in Fig. 4 to receive the pin P and permit the sleeve S to move longitudinally on the arbor and at the same time to rotate with the arbor. The extremity of the reduced end of the sleeve is threaded to receive the cap E which is recessed on its inner face to allow motion of the arbor and pin during the designed operation of the device. The face of the dial may be perforated as shown to economize space and to permit a greater movement to the sleeve S.

Balances to which my improvement is applied may be used in all respects as ordinary balances, but when it is desired to ascertain the net weight of substances such, for instance, as butter or lard, and to allow for the weight of the containing vessel, the procedure would be as follows:

In the form shown the parts are normally in the position of Fig. 2 where the spring $s$ is shown as pressing the sleeve, pointer and pin P together, and binding the pointer so that it moves with the arbor. First the vessel or package would be placed in the scale-pan and after the pointer comes to rest the cap E must be pressed which would slide the sleeve longitudinally on the arbor against the pressure of the spring $s$, and relieve the bearing of the shoulder T upon the pin P, and consequently release the pressure upon the pointer, which is then free to move on the sleeve. This is the position of the parts in Fig. 3. The loosened pointer now drops to the zero position on the scale. When the pointer has been restored to zero the pressure on the cap may be relieved when the parts will be forced together to engage the pointer firmly upon the shaft and to permit it to move therewith. If the substance to be weighed be introduced into the vessel upon the scale-pan, the pointer will move over the scale as before and will now indicate the true or net weight of the substance.

What I claim, and desire to secure by Letters Patent, is—

1. In a balance the combination of the dial, the arbor a shouldered sleeve hung and movable thereon, a pointer loosely hung on the sleeve, a pin on the arbor, and movable therewith, and a spring to force the shoulder of said sleeve toward the pin to engage the pointer, as set forth.

2. In a balance the combination of an arbor, a pin thereon, a shouldered sleeve having a reduced slotted extension and movable on said arbor, a pointer loosely carried on said sleeve and a spring for causing frictional contact between said sleeve, pin and pointer and means connected with the extension on the sleeve for releasing the frictional contact, substantially as and for the purposes specified.

GEORGE H. CHATILLON.

Witnesses:
LOUIS A. TRAUBERY,
HARRY M. TURK.